United States Patent
Tusim et al.

(10) Patent No.: US 6,251,319 B1
(45) Date of Patent: Jun. 26, 2001

(54) METHOD OF FORMING A THERMOFORMABLE POLYPROPYLENE FOAM SHEET

(75) Inventors: Martin H. Tusim, Midland, MI (US); Martin C. Cornell, Lake Jackson, TX (US); Kyung W. Suh, Midland; Christopher P. Christenson, Beaverton, both of MI (US); Chung P. Park, Baden-Baden (DE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/302,306

(22) Filed: Apr. 30, 1999

(Under 37 CFR 1.47)

Related U.S. Application Data

(60) Provisional application No. 60/086,944, filed on May 27, 1998, and provisional application No. 60/089,058, filed on Jun. 12, 1998.

(51) Int. Cl.⁷ .............................. B29C 44/20; B29C 44/24
(52) U.S. Cl. .............................. 264/45.9; 264/50; 264/53; 264/146; 264/DIG. 5
(58) Field of Search .............................. 264/45.9, 50, 51, 264/53, 146, DIG. 5

(56) References Cited

U.S. PATENT DOCUMENTS

| | | | |
|---|---|---|---|
| 3,557,265 | * 1/1971 | Chisolm et al. | 264/46.1 |
| 3,637,458 | 1/1972 | Parrish . | |
| 3,879,507 | * 4/1975 | Cavanna et al. | 264/51 |
| 4,076,698 | 2/1978 | Anderson et al. . | |
| 4,160,638 | * 7/1979 | Kolossow | 425/302.1 |
| 4,522,955 | 6/1985 | Fukushima et al. . | |
| 4,801,484 | 1/1989 | Yao et al. . | |
| 4,824,720 | 4/1989 | Malone . | |
| 5,116,881 | 5/1992 | Park et al. . | |
| 5,149,579 | 9/1992 | Park et al. . | |
| 5,180,751 | 1/1993 | Park et al. . | |
| 5,272,236 | 12/1993 | Park et al. . | |
| 5,338,764 | * 8/1994 | Lesca et al. | 521/60 |
| 5,340,840 | 8/1994 | Park et al. . | |
| 5,348,795 | 9/1994 | Park . | |
| 5,460,870 | 10/1995 | Arthurs . | |
| 5,527,573 | 6/1996 | Park et al. . | |
| 5,567,742 | 10/1996 | Park . | |
| 5,670,211 | 9/1997 | Huber et al. . | |
| 5,677,383 | 10/1997 | Chum et al. . | |
| 5,817,705 | 10/1998 | Wilkes et al. . | |

FOREIGN PATENT DOCUMENTS

| | | |
|---|---|---|
| 0570221 | 11/1993 | (EP) . |
| 882622 | 9/1998 | (EP) . |
| 1307850 | 2/1973 | (GB) . |

* cited by examiner

Primary Examiner—Allan R. Kuhns

(57) ABSTRACT

A process for making a polymer foam sheet, which comprises (i) extruding through an annular extrusion die a foamable composition comprising at least one polypropylene polymer and at least one blowing agent, at a pressure, temperature, and extrusion rate sufficient to prevent foaming of the composition prior to exiting the die, under conditions sufficient to form a foam tube having a density of at least 16 kg/m³ and no greater than 200 kg/m³, an open cell content of less than 70 percent, a circumference of at least 1 meter, and a foam thickness of at least 2 mm and no greater than 25 mm, wherein the blowing agent is used in an amount of from 0.2 to 4.5 moles per kg of polymer, (ii) allowing the foam to cool to a temperature below the melt temperature of the polypropylene, and (iii) cutting the tube of foam along its radius to form a foam sheet, wherein at least 70 percent by weight of the polymer in such sheet is a polypropylene having a melt strength in the range of from 25 to 60 cN when measured at 190° C.

24 Claims, 1 Drawing Sheet

METHOD OF FORMING A THERMOFORMABLE POLYPROPYLENE FOAM SHEET

This application claims the benefit of U.S. Provisional applications Ser. Nos. 60/086944, filed May 27, 1998, and 60/089058, filed Jun. 12, 1998, which are hereby incorporated by reference in their entirety.

BACKGROUND OF THE INVENTION

The present invention relates to extruded thermoplastic foams.

Rigid foam sheets have a variety of applications, including feedstock for thermoforming applications, such as cups, bowls, non-flexible applications where stiffness is needed to span large distances, as in automobile headliner substrates or packaging decks, trays, etc. However, certain applications require higher heat resistance than are typically seen with foams of polymers such as polyethylene and polystyrene. Polyurethane foam is a foam typically employed in such applications, but may not be as readily thermoformable as a foam of a thermoplastic polymer. Foam sheet made from foamable polypropylene beads are a means to obtain a thermoformable foam having a relatively high heat resistance, but the foam may not have impact resistance or flex and tensile strength properties required for certain applications. Also, polypropylene bead foams are often made from polypropylene copolymers which are more flexible than polypropylene homopolymer foams and will have a lower heat resistance property as compared to foams made from homopolymer polypropylene.

U.S. Pat. No. 3,637,458 discloses microcellular foam sheet made by an extrusion process from polypropylene polymer, but the use of relatively large amount of blowing agent in such processes produces a foam which may not have the desired density, thickness, or stiffness needed for certain applications.

SUMMARY OF THE INVENTION

In one aspect, this invention is a process for making a polymer foam sheet, which comprises (i) extruding through an annular extrusion die a foamable composition comprising at least one polypropylene polymer and at least one blowing agent, at a pressure, temperature, and extrusion rate sufficient to prevent foaming of the composition prior to exiting the die, under conditions sufficient to form a foam tube having a density of at least 16 kg/m$^3$ and no greater than 200 kg/m$^3$, an open cell content of less than 70 percent, a circumference of at least 1 meter, and a foam thickness of at least 2 mm and no greater than 25 mm, wherein the blowing agent is used in an amount of from 0.2 to 4.5 moles per kg of polymer, (ii) allowing the foam to cool to a temperature below the melt temperature of the polypropylene, and (iii) cutting the tube of foam along its radius to form a foam sheet, wherein at least 70 percent by weight of the polymer in such sheet is a polypropylene having a melt strength in the range of from 30 to 60 cN when measured at 190° C.

It has been discovered that the invention provides a means to prepare relatively dense, closed-cell or partially open cell, thermoformable foam sheets from polypropylene polymers. These and other advantages of the invention will be apparent from the description that follows.

DETAILED DESCRIPTION OF THE INVENTION

Figure 1:
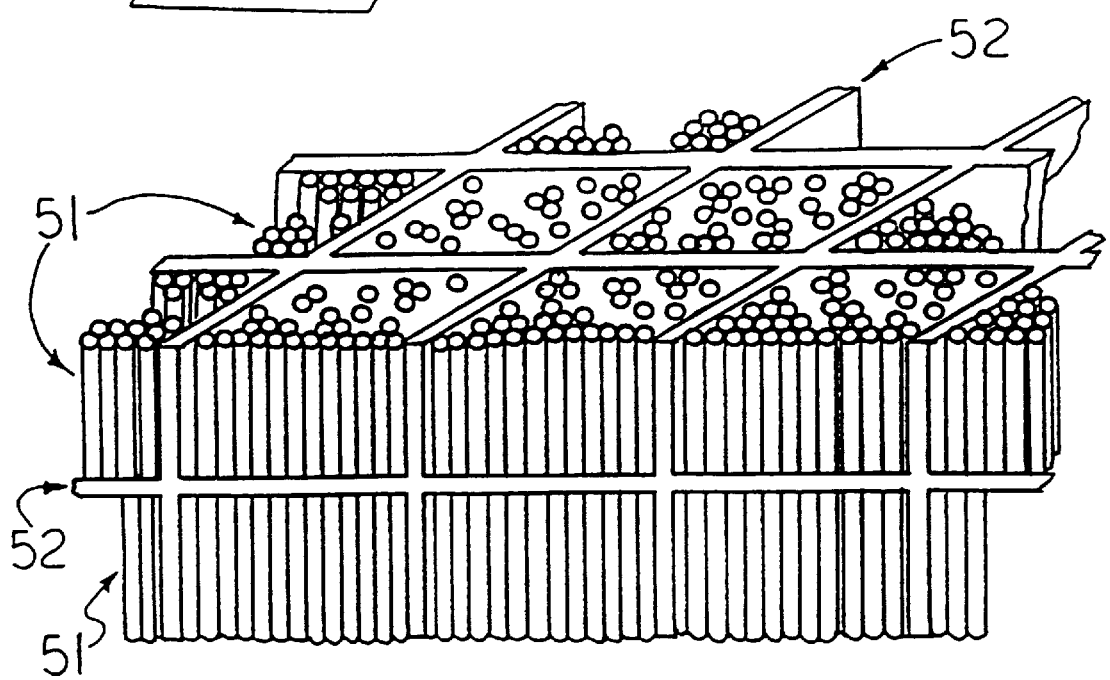
FIG. 1 shows a plate/profile and foam combination having a rectangular grid pattern that has foamed portions 51 and non-foamed portions 52.

The foam sheet prepared by the process of the invention is readily thermoformable to a desired shape, configuration, or contour; is rigid enough to prevent sagging and substantially maintain its shape—even when exposed to elevated temperatures commonly encountered in motor vehicles in hot weather and/or direct sunlight conditions. The foam sheet also offers good cushioning properties and exhibits good sound and thermal absorption. The surface of the foam sheet is also preferably relatively free of rips, tears, folds and other surface defects that impair its use in the desired application.

The foam preferably has an open cell content of less than 70 percent, more preferably less than 50 percent, more preferably less than 40 percent, most preferably less than 30, more preferably less than 20 percent. Open cell content is determined according to ASTM D2856-A. Closed cell foams provide advantages of better thermal insulating capability and resiliency and open cell foams provide advantages of better sound insulation, dimensional stability, and heat transfer during thermoforming.

The thermoplastic foam preferably has a density before thermoforming of at least 25 kg/m$^3$, more preferably at least 32 kg/m$^3$, most preferably at least 35 kg/m$^3$; but is preferably no greater than 200, more preferably no greater than 160, and most preferably no greater than 100, kilograms per cubic meter as measured according to ASTM D3575-93 Suffix W Method B. The foam preferably has an average cell size of at least 0.1 mm, more preferably at least 0.5 mm, more preferably at least 0.75 mm, most preferably at least 1.0 mm; but is preferably no greater than 6 mm, more preferably no greater than 5 mm, and most preferably no greater than 4 mm, according to ASTM D3576. Most preferred density and cell size ranges will vary depending upon the composition of the foam and desired physical properties. For instance, a foam can usually be made more rigid by increasing density or cell size.

The foam must be resistant to heat distortion and be dimensionally stable at elevated temperatures commonly encountered at the roof of a motor vehicle due to solar heating, up to 125° C. The foam preferably exhibits a dimensional stability change of about 5 percent or less and more preferably about 1 percent or less with respect to both expansion and shrinkage according to SAE 883.

The foam sheet preferably has a cross-sectional thickness of at least 5 mm, more preferably at least 7 mm, most preferably at least 8 mm; but is preferably no greater than 25 mm, more preferably no greater than 23 mm, and most preferably no greater than 20 mm. Its width is preferably at least 1 m, more preferably at least 1.1 m, most preferably at least 1.2 m; but is preferably no greater than 2.5 m, more preferably no greater than 2.2 m, and most preferably no greater than 2.0 m.

The foam sheet is readily thermoformable to a desired shape, configuration, or contour. The term "thermoformable" means the foam may be thermoformed or otherwise shaped under heat and mechanical pressure by any conventional means known in the art to a different shape or contour, depending on the application. If desired, a decorative layer such as a fabric layer of woven thermoplastic fibers may be thermally welded or otherwise adhered to the foam during or after the thermoforming process.

The physical properties and thermal resistance of the foam may be enhanced by forming or inducing the formation of a substantially non-foamed skin on the foam such as by laminating plastic films or sheets to the foam, by coating it with a plastic resin, heating a surface or surfaces of the foam above its glass transition temperature or the melting point to collapse the cellular structure at the skin, or a combination of any of the foregoing. The film, sheet, or coating may comprise any known thermoplastic resin or thermoset resin. Useful thermoplastic resins include those described above with respect to those composing the foam and useful thermoset resins include polyurethanes and epoxies.

The term "polypropylene" as used herein means a polymer having at least 50 weight percent of propylene monomeric units and having a melt strength in the range of from 25 to 60 cN when measured at 190° C., as measured by a Rheotens™ melt tension apparatus, as well as mixtures of such polymers. The melt strength of a molten polymer may be tested by extruding the polymer by this equipment through a capillary die with an diameter of 2.1 mm and a length of 41.9 mm at 190° C. at a rate of 0.030 cc/sec.; the strand is then stretched at a constant acceleration while measuring the elongation. Preferably, the melt strength of the polypropylene is at least 28, more preferably at least 30, most preferably at least 33 cN; but is preferably no greater than 60, more preferably no greater than 55, and most preferably no greater than 50 cN.

The polypropylene preferably comprises at least 70 weight percent of propylene monomer units.

The polypropylene used in the process of the invention preferably has a melt elongation of at least 100 percent, more preferably at least 150 percent, most preferably at least 200 percent as measured by a Rheotens™ melt tension apparatus. The molten polymer is extruded by this equipment through a capillary die with an diameter of 2.1 mm and a length of 41.9 mm at 190° C. at a rate of 0.030 cc/sec.; the strand is then stretched at a constant acceleration while measuring the force to stretch at a particular elongation. The propylene polymer material preferably has a melt flow rate of between about 0.05 and 50 and preferably between 0.1 and 20 dg/min. according to ASTM D1238 Condition L. The polymer solids of the foam made by the process of the invention consist of at least 70 percent by weight of polypropylene polymer, more preferably at least 80 weight percent, and most preferably at least 85 weight percent.

Preferred resins are those polypropylene resins that are branched or lightly cross-linked. Branching (or light cross-linking) may be obtained by those methods generally known in the art, such as chemical or irradiation branching/light cross-linking. One such resin which is prepared as a branched/lightly cross-linked polypropylene resin prior to using the polypropylene resin to prepare a finished polypropylene resin product and the method of preparing such a polypropylene resin is described in U.S. Pat. No. 4,916,198, which is hereby incorporated by reference. Another method to prepare branched/lightly cross-linked polypropylene resin is to introduce chemical compounds into the extruder, along with a polypropylene resin and allow the branching/lightly cross-linking reaction to take place in the extruder. U.S. Pat. No. 4,714,716 illustrates this method and is incorporated by reference. Irradiation techniques are illustrated by U.S. Pat. No. 5,605,936, which is also incorporated by reference. The polymer composition used to prepare the foam preferably has a gel content of less than 10 percent, more preferably less than 5 percent, per ASTM D2765-84, Method A.

Other polymer materials that may be incorporated into the foamable polymer composition include copolymers of propylene and copolymerizable ethylenically unsaturated comonomers. The propylene polymer material may be comprised solely of one or more propylene homopolymers, one or more propylene copolymers, a blend of one or more of each of propylene homopolymers and copolymers, or blends of any of the foregoing with a non-propylenic polymer.

Suitable monoethylenically unsaturated comonomers include olefins, vinylacetate, methylacrylate, ethylacrylate, methyl methacrylate, acrylic acid, itaconic acid, maleic acid, maleic anhydride, and the like.

Particularly useful propylene copolymers are those copolymers of propylene and one or more non-propylenic olefins. Propylene copolymers include random, block, and grafted copolymers or interpolymers of propylene and an olefin selected from the group consisting of ethylene, $C_4$–$C_{10}$ 1-olefins, and $C_4$–$C_{10}$ dienes. Propylene copolymers also include random terpolymers of propylene and 1-olefins selected from the group consisting of ethylene and $C_4$–$C_8$ 1-olefins. Interpolymers having both ethylene and $C_4$–$C_8$ 1-olefins, the ethylene content is preferably 45 percent or less by weight. The $C_4$–$C_{10}$ 1-olefins include the linear and branched $C_4$–$C_{10}$ 1-olefins such as, for example, 1-butene, isobutylene, 1-pentene, 3-methyl-1-butene, 1-hexene, 3,4-dimethyl-1-butene, 1-heptene, 3-methyl-1-hexene, and the like. Examples of $C_4$–$C_{10}$ dienes include 1,3-butadiene, 1,4-pentadiene, isoprene, 1,5-hexadiene, 2,3-dimethyl-1,3-hexadiene, and the like.

Suitable non-propylenic polymers that may be used in the foamable composition include high, medium, low, and linear density polyethylenes, polybutene-1, ethylene/acrylic acid copolymer, ethylene/vinyl acetate copolymer, ethylene/propylene copolymer, styrene/butadiene copolymer, ethylene/styrene copolymer, ethylene/ethyl acrylate copolymer, ionomer and the like. The foamable polymer composition may, if desired, contain other useful thermoplastics such as high density polyethylene, chlorinated polyethylene, TPO mixtures of EPDM rubbers (ethylene/propylene/diamine copolymers) and polyethylene.

The blowing agent may comprise any known in the art such as chemical blowing agents and physical blowing agents of organic and/or inorganic composition. The blowing agent may consist of a blend of organic agents, a blend of inorganic agents, or a blend of organic and inorganic agents. Suitable inorganic blowing agents useful include carbon dioxide, nitrogen, argon, water, air, nitrogen, and helium. Suitable organic blowing agents include aliphatic hydrocarbons having 1–9 carbon atoms and halogenated aliphatic hydrocarbons, having 1–4 carbon atoms. Aliphatic hydrocarbons include methane, ethane, propane, n-butane, isobutane, n-pentane, isopentane, neopentane, and the like. Among halogenated hydrocarbons, fluorinated hydrocarbons are preferred. Examples of fluorinated hydrocarbon include methyl fluoride, perfluoromethane, ethyl fluoride, 1,1-difluoroethane, 1,1,1-trifluoroethane (HFC-143a), 1,1,1, 2-tetrafluoro-ethane (HFC-134a), pentafluoroethane, perfluoroethane, 2,2-difluoropropane, 1,1,1-trifluoropropane, perfluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2, 2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depletion potential. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

The amount of blowing agent incorporated into the polymer melt to make a foam-forming polymer gel is from about 0.2 to about 4.5, preferably from about 0.3 to about 3.0, and most preferably from about 0.5 to 2.50 moles per kilogram of polymer. In addition, a nucleating agent may be added in the foaming process in order to control the size of foam cells. Preferred nucleating agents include inorganic substances such as calcium carbonate, talc, clay, titanium dioxide, silica, barium sulfate, calcium stearate, barium stearate, diatomaceous earth, mixtures of citric acid and sodium bicarbonate, and the like. The amount of nucleating agent employed may range from about 0.01 to about 5 parts by weight per hundred parts by weight of the polymer resin. The preferred range is from 0.1 to about 3 parts by weight.

It is also possible to add various additives in the foam and in the foaming process such as pigments, dyes, antioxidants, acid scavengers, ultraviolet absorbers, flame retardants, processing aids, extrusion aids, and the like.

The process of the invention may be carried out by heating a thermoplastic polymer to form a plasticized or melt polymer material, incorporating therein a physical blowing agent to form a foamable gel, cooling the foamable gel and extruding the gel through an annular-shaped extrusion die to form a tube-shaped foam, which is then further cooled below the crystallization temperature of the polypropylene and cut lengthwise along its radius to form a sheet having a width equal to the circumference of the tube. The blowing agent may be incorporated or mixed into the plastic melt by any means known in the art such as with an extruder, mixer, blender, or the like. Prior to mixing with the blowing agent, the polymer material is heated to a temperature at or above the glass transition temperature or the melting point of the material. The blowing agent is mixed with the plastic melt at an elevated pressure sufficient to prevent substantial expansion of the melt and to generally disperse the blowing agent homogeneously within the melt. Optionally, a nucleator, stabilizers, colorants, and other additive maybe blended in the polymer melt. The feeding rate of blowing agent and nucleator and other additives are adjusted to achieve a relatively low density foam and small cell size, which results in a foam having thin cell walls. After incorporation of the blowing agent, the foamable gel is typically cooled to a lower temperature to optimize physical characteristics of the foam product. The gel is then extruded through a die of desired size to a zone of lower pressure to form the foam product. If a chemical blowing agent is used, it is incorporated into the melt polymer material and extruded or conveyed to a zone of elevated temperature where the agent decomposes to form a gas, usually carbon dioxide. The melt polymer material/gas mixture expands to form a foam.

U.S. Pat. No. 4,323,528, herein incorporated by reference, relates making polyolefin foams via an accumulating extrusion process. The process comprises: 1) mixing a thermoplastic material and a blowing agent to form a polymer gel; 2) extruding the gel into a holding zone maintained at a temperature and pressure which does not allow the mixture to foam; the holding zone has a die defining an orifice opening into a zone of lower pressure at which the gel foams and an openable gate closing the die orifice; 3) periodically opening the gate; 4) substantially concurrently applying mechanical pressure by means of a movable ram on the gel to eject it from the holding zone through the die orifice into the zone of lower pressure, and 5) allowing the ejected gel to expand to form the foam.

Foam strength or stiffness may be enhanced by extruding relatively thin substantially non-foamed plates or profiles within it. Extrudates or plastic melts with and without blowing agent can be conveyed through different orifices within the extrusion die and allowed to coalesce to form a foam having foamed and non-foamed, or less foamed portions. In the extrusion cross-section of the foam, the non-foamed resin plates or portions can take on a regular or irregular pattern. The plates or profiles may be intersecting or non-intersecting with respect to each other. Possible cross-section patterns for non-foamed profiles or plates within the foam include honeycomb-shaped, circular, rectangular or diagonal grid patterns.

It is also possible to manufacture extruded structures having foamed and non-foamed portions by cutting a foam with a hot wire and subsequently reuniting or coalescing the severed foam pieces so that they are heat welded together. Preferably, heat welding would occur immediately after the foam has been severed by the hot wire. The application of heat to the foam collapses the cellular structure of the foam adjacent the wire and creates a non-foamed plate or profile within the foam after severed foam pieces are coalesced.

It is also possible to manufacture structures having foamed and non-foamed portions by laminating foamed and non-foamed profiles or layers to each other in an alternating configuration to form a unitary structure. Such profiles or layers could be laminated together by heat-welding or adhesion.

The physical properties and thermal resistance of the foam may be enhanced by adding particulates or fibers of organic or inorganic materials in the form of fillers. Such particulates or fibers could be added to foam-forming compositions during manufacturing. Useful materials include carbon black particulates, clay particulates, carbon or graphite fibers, polypropylene fibers, polyester fibers, and nylon fibers, glass fibers, and acrylonitrile fibers. The physical properties and thermal resistance of the foam may also be enhanced by laminating to the foam non-foamed film/sheet layers or coatings containing such particulates or fibers. Fibers may be of any length, short (fibrils) or long. They may be randomly dispersed or woven or placed together in the nature of a fabric or prepreg.

Adhesives known in the art may be employed to adhere the foam sheet of the invention to each other or to other materials. Useful adhesives include thermoset adhesives such as polyurethane resins and epoxies and thermoplastic adhesives such as polyethylenes, polypropylenes, ethylene copolymers; propylene copolymers; and the like. Useful adhesives are taught in U.S. Pat. Nos. 5,460,870 and 5,670,211. The adhesives may be applied by any means known in the art such as by spraying, coating, or in film form. Preferred adhesives are thermoplastic because of their lower cost and potential recyclability. The presence of an adhesive is not critical to the present invention.

A layer or layers of a decorative material such a felt or fabric may be applied to the surface or surface of the foam sheet. The layer may be of any type known in the art. Those most typically employed commercially are felts or woven fabrics. Useful fabrics include those of woven polyester, nylon, and polypropylene fibers. Preferably, the felt or fabric layer is comprised of the same or similar polymeric material as the foam. The felt or fabric layer may be adhered to the foam by any means known in the art such as thermal welding, adhesive films, or adhesive liquids or coatings. A preferred decorative layer is a woven fabric of thermoplastic fibers thermally welded to the core layer without the benefit of adhesives. Thermal welding refers to the heating of the fabric layer to an extent such that the fibers become tacky or sticky and are able to adhere to the core layer without the benefit of an adhesive. A fabric layer may also be thermally welded to a core layer if applied to the core layer during thermoforming or when the core layer is at an elevated temperature.

The foam is readily thermoformable to a desired shape, configuration, or contour. The term "thermoformable" means the foam may be thermoformed or otherwise shaped under heat and mechanical pressure by any means known in the art to a different shape or contour. Typically, the foam is pressed under heat and pressure to form a contoured sheet similar in shape and contour to the roof of the motor vehicle under which it is to be positioned. If desired, a decorative layer such as a fabric layer of woven thermoplastic fibers may be thermally welded to the foam during the thermoforming process. The foam sheet prepared by the process of the invention is preferably moldable at temperatures in the range of from 130° C. to 170° C. and pressures in the range of 34 to 650 kPa.

The physical properties and thermal resistance of the foam may be enhanced by forming or inducing the formation of a substantially non-foamed skin on the foam such as by laminating plastic films or sheets to the foam, by coating it with a plastic resin, heating a surface or surfaces of the foam below its glass transition temperature or the melting point to collapse the cellular structure at the skin, or a combination of any of the foregoing. The film, sheet, or coating may comprise any known thermoplastic resin or thermoset resin. Useful thermoplastic resins include those described above with respect to those composing the foam and useful thermoset resins include polyurethanes and epoxies.

The following examples are illustrative of the invention, but are not to be construed as to limiting the scope thereof in any manner.

ILLUSTRATIVE EMBODIMENTS

Example 1

An extruded polypropylene foam sheet is produced. The apparatus for producing the foam comprised an extruder, mixer, cooler, and an annular extrusion die in series. The polymer was fed in granular form to the extruder where it was mixed with additives to form a polymer melt. The polypropylene (PP) polymer used was PF-814 (from Montell). PF-814 is a high melt strength PP resin with a melt flow rate of 3 dg/min as measured by test method ASTM D-1238. The feed rate of the polypropylene polymer was 1000 pounds per hour (454 kg/h). The polypropylene resin was mixed with 0.25 pounds of talc per one hundred pounds (pph) of polymer. Additionally, 0.1 pounds of Irganox 1010 stabilizer (from Ciba-Geigy Corporation) and 0.1 pounds of Ultranox 626 (from GE Specialty Chemicals, Inc.) stabilizer were added per one hundred pounds of polymer. The extruder conditions ranged from 170° C. at the feed end of the extruder to 220° C. at the conveying end of the extruder. The polymer and additives melt was conveyed to the mixer where 5 parts isobutane blowing agent per 100 parts polymer was incorporated therein under pressure to form a foamable gel. The foamable gel was cooled to 165° C. and conveyed to the die under pressure where it expanded out of the annular orifice of 5" diameter to an area of lower pressure (normal atmospheric pressure), around a 20" diameter mandrel to form a tubular foam sheet product. The tubular sheet was then split to form a flat sheet.

The foam had a thickness of 5 millimeters (mm) and a width of 1600 mm, an open cell content of 1.6 percent, a density of 2.7 pounds per cubic foot (pcf) (43.2 kilograms per cubic meter (kgm)) and an average cell size of 1.7 mm. The foam was relatively rigid, did not sag when supporting its own weight, and was thermoformable. The foam had a Foamability Factor as described in U.S. Pat. No. 5,527,573 of 5.3.

Example 2

Another extruded polypropylene foam sheet was produced on the apparatus disclosed in Example 1 with the same blowing agent content and loading and substantially the same processing conditions as in Example 1 but with a larger die gap opening and a slower take-away draw speed.

The foam had a thickness of 9 mm and a width of 1600 mm wide, an open cell content less than 2 percent, a density of 2.4 pcf (38 kgm), and an average cell size 1.7 mm. The foam was relatively rigid and did not sag when supporting its own weight. The foam had a Foamability Factor of 4.7.

Example 3

An extruded polypropylene foam sheet was produced on the apparatus disclosed in Example 1 with the same blowing agent content and loading and substantially the same processing conditions as in Example 1.

The foam had a thickness of 7 mm and a width of 1600 mm wide, an open cell content 19 percent, and a density of 2.9 pcf (46.1 kgm) and an average cell size of 1.75 mm. The foam was relatively rigid, did not sag when supporting its own weight, and was thermoformable. The foam had a Foamability Factor of 5.8.

Example 4

An extruded polypropylene foam sheet was produced on the apparatus disclosed in Example 1 with the same blowing agent and additives plus the addition of calcium stearate powder for additional cell nucleation. The polypropylene polymer was fed to the extruder at 990 lb/h (449 kg/h), along with 0.42 pph talc, 0.3 pph Ultranox 815P stabilizer (from GE Specialty Chemicals), 0.3 pph calcium stearate. The plasticized gel mixture was then mixed with 3.9 pph isobutane under pressure, cooled to 161° C. and conveyed to an annular die where it was allowed to expand into a region of lower pressure, stretched over a 16" diameter cooling mandrel to form a tubular foam sheet product. The tubular sheet was then split to form a flat sheet.

The foam had a thickness of 7 mm and a width of 1290 mm, an open cell content of 20.4 percent, a density of 3.3 pcf (52.9 kgm) and an average cell size of 3.6 mm. The foam was relatively rigid, did not sag when supporting its own weight, and was thermoformable. The foam had a flexural strength at failure value of 175 psi (1.21 Mpa) as tested by the method described in SAE J949, and a Foamability Factor of 13.6.

Example 5

Another extruded polypropylene foam sheet was produced on the apparatus disclosed in Example 1 with the same blowing agent and additives plus the addition of calcium stearate powder for additional cell nucleation. The polypropylene polymer was fed to the extruder at 1380 lb/h (626 kg/h), along with 0.30 pph talc, 0.21 pph Ultranox 815P stabilizer (from GE Specialty Chemicals), 0.3 pph calcium stearate. The plasticized gel mixture was then mixed with 3.9 pph isobutane under pressure, cooled to 161.5° C. and conveyed to an annular die where it was allowed to expand into a region of lower pressure, stretched over a 20 inch diameter cooling mandrel to form a tubular foam sheet product. The tubular sheet was then split to form a flat sheet.

The foam had a thickness of 10.9 mm and a width of 1600 mm, an open cell content of 2.2 percent, a density of 3.4 pcf (54.5 kgm) and an average cell size of 5.2 mm. The foam was relatively rigid, did not sag when supporting its own weight, and thermoformable. The foam had a flexural strength at failure value of 141 psi (1 Mpa) as tested by the method described in SAE J949, a Foamability Factor of 20.3.

Example 6

An extruded foam sheet was produced from a blend of 75 percent polypropylene PF-814 from Montell and 25 percent AFFINITY™ PL-1880 polyethylene from The Dow Chemical Company. PL-1880 is polyethylene resin with a 1.0 dg/min melt index value with a 0.9020 g/cc density and a I10/I2 of 9.0. The foam sheet was made on the apparatus disclosed in Example 1. The polymer blend was fed to the extruder at 1000 lb/h (454 kg/h), along with 0.4 pph talc and 0.3 pph Ultranox 815P stabilizer (from GE Specialty Chemicals). The plasticized gel mixture was then mixed with 6.0 pph isobutane under pressure, cooled to 157° C. and conveyed to an annular die where it was allowed to expand into a region of lower pressure, stretched over a 20 inch diameter cooling mandrel to form a tubular foam sheet product. The tubular sheet was then split to form a flat sheet.

The foam had a thickness of 7 mm and a width of 1600 mm, an open cell content of 14.4 percent, a density of 3.6 pcf (57.7 kgm) and an average cell size of 3.4 mm. The foam was relatively rigid, did not sag when supporting its own weight, and was thermoformable. The foam had a flexural strength at failure value of 72 psi (0.5 Mpa) as tested by the method described in SAE J949, and a Foamability Factor of 14.0.

Example 7

An extruded foam sheet was produced from a blend of 75 percent polypropylene PF-814 from Montell and 25 percent AFFINITY™ PL-1880 polyethylene from The Dow Chemical Company. PL-1880 is polyethylene resin with a 1.0 dg/min melt index value with a 0.9020 g/cc density and a I10/I2 of 9.0. The foam sheet was made on the apparatus disclosed in Example 1. The polymer blend was fed to the extruder at 1000 lb/h (454 kg/h), along with 0.4 pph talc and 0.3 pph Ultranox 815P stabilizer (from GE Specialty Chemicals). The plasticized gel mixture was then mixed with 6.0 pph isobutane under pressure, cooled to 157° C. and conveyed to an annular die where it was allowed to expand into a region of lower pressure, stretched over a 20 inch diameter cooling mandrel to form a tubular foam sheet product. The tubular sheet was then split to form a flat sheet.

The foam had a thickness of 9.8 mm and a width of 1600 mm, an open cell content of 5.8 percent, a density of 2.7 pcf (43.3 kgm) and an average cell size of 4.5 mm. The foam was relatively rigid, did not sag when supporting its own weight, and was thermoformable. The foam had a flexural strength at failure value of 70 psi (0.5 Mpa) as tested by the method described in SAE J949, and a Foamability Factor of 13.0.

Example 8

An extruded foam sheet was produced from a blend of 75 percent polypropylene PF-814 from Montell and 25 percent AFFINITY™ PL-1880 polyethylene from The Dow Chemical Company. PL-1880 is polyethylene resin with a 1.0 dg/min melt index value with a 0.9020 g/cc density and a I10/I2 of 9.0. The foam sheet was made on the apparatus disclosed in Example 1. The polymer blend was fed to the extruder at 1200 lb/h (545 kg/h), along with 0.4 pph talc and 0.3 pph Ultranox 815P stabilizer (from GE Specialty Chemicals). The plasticized gel mixture was then mixed with 6.0 pph isobutane under pressure, cooled to 156° C. and conveyed to an annular die where it was allowed to expand into a region of lower pressure, stretched over a 20 inch diameter cooling mandrel to form a tubular foam sheet product. The tubular sheet was then split to form a flat sheet.

The foam had a thickness of 14.6 mm and a width of 1600 mm, an open cell content of 3.3 percent, a density of 2.6 pcf (41.7 kgm) and an average cell size of 3.2 mm. The foam was relatively rigid, did not sag when supporting its own weight, and was thermoformable. The foam had a flexural strength at failure value of 58 psi (0.4 Mpa) as tested by the method described in SAE J949. The foam has a Foamability Factor of 9.5.

Example 9

The foam sheet of Example 8 was laminated with a 1.6 mil (0.04 mm) thick multilayer film. The film was made of two layers: a) ethylene acrylic acid copolymer/linear low density polyethylene blend (60/40); b) copolymer polypropylene/maleic anhydride modified PP (70/30). The adhesive layer a) composed 70% of the thickness of the film. The film was laminated to one side of the foam. After the lamination, the film/foam structure was cut into a 3 inch by 12 inch section and tested for flex strength, as in SAE Test J949. The resultant structure required greater than 25 newtons to bend 1 inch (25.4 mm). The foam has a Foamability Factor of 9.5. The foam was cut and molded into the desired profile of a vehicle headliner, and a layer of a decorative fabric was adhered thereto. The headliner was installed in a vehicle adjacent to the underside of the vehicle roof, and attached thereto by means of a suitable adhesive.

Example 10

The foam sheet of Example 5 was laminated with a 1.6 mil (0.04 mm) thick multilayer film as described in Example 9. The film was laminated to one side of the foam. After the lamination, the film/foam structure was cut into a 3 inch by 12-inch section and tested for flex strength, as in SAE Test J949. The foam has a Foamability Factor of 20.3. The resultant structure required greater than 45 newtons to bend 1 inch (25.4 mm). The foam of Example 5 required 20 newtons to bend the foam 1 inch (25.4 mm).

Example 11

The foam sheet of Example 7 was laminated with a 1.6 mil (0.04 mm) thick multilayer film as described in Example 9. The film was laminated to one side of the foam. After the lamination, the film/foam structure was cut into a 3 inch by 12 inch section and tested for flex strength, as in SAE Test J949. The foam has a Foamability Factor of 13.0. The resultant structure required greater than 14 newtons to bend 1 inch (25.4 mm).

Additionally, it was found that in order to make an acceptable foam from the combinations of polymers and blowing agents described in the examples above, the pressure of the molten polymer and blowing agent mixture prior to entering the die was preferably at least 3.0 MPa, more preferably 3.3 MPa, and most preferably 3.4 MPa, in order maintain the blowing agent in solution within the molten polymer. This pressure was measured by a standard pressure gauge mounted prior to the annular die body. The pressures measured for each example are listed in Table 1.

TABLE 1

| Example Number | Gel Pressure Prior to Die (MPa) |
|---|---|
| 1 | 5.2 |
| 2 | 5.3 |
| 3 | 5.4 |
| 4 | 3.5 |
| 5 | 3.8 |
| 6 | 4.8 |
| 7 | 3.9 |
| 8 | 4.4 |

What is claimed is:

1. A process for making a polymer foam sheet, which comprises (i) extruding through an annular extrusion die a foamable composition comprising at least one polypropylene polymer and at least one blowing agent, at a pressure, temperature, and extrusion rate sufficient to prevent foaming of the composition prior to exiting the die, under conditions sufficient to form a foam tube having a density of at least 16 kg/m$^3$ and no greater than 200 kg/m$^3$, an open cell content of less than 70 percent, a circumference of at least 1 meter, and a foam thickness of at least 7 mm and no greater than 25 mm, wherein the blowing agent is used in an amount of from 0.2 to 4.5 moles per kg of polymer, (ii) allowing the foam to cool to a temperature below the melt temperature of the polypropylene, and (iii) cutting the tube of foam along its radius to form a foam sheet, wherein at least 70 percent by weight of the polymer in such sheet is a polypropylene having a melt strength in the range of from 25 to 60 cN when measured at 190° C.

2. The process of claim 1 wherein the foam solids comprise at least 80 percent by weight of the polymer in such sheet is a polypropylene having a melt strength in the range of from 25 to 60 cN when measured at 190° C.

3. The process of claim 1 wherein the foam has a density of least 32 kg/m$^3$.

4. The process of claim 1 wherein the sheet has a width of at least 1.1 m.

5. The process of claim 1 wherein the sheet has a width of at least 1.1 m and a thickness of at least 8 mm.

6. The process of claim 1 wherein the sheet has a width of at least 1.2 m.

7. The process of claim 1 wherein the sheet has a width of at least 1.2 m.

8. The process of claim 1 wherein the sheet has a width of at least 1.2 m and a thickness of at least 8 mm.

9. The process of claim 1 wherein the blowing agent is isobutane.

10. The process of claim 1 wherein the blowing agent is a combination of an organic and an inorganic blowing agent.

11. The process of claim 1 wherein the organic blowing agent is selected from n-butane, isobutane, propane, and ethanol.

12. The process of claim 10 wherein the organic blowing agent is selected from n-butane, isobutane, propane, and ethanol.

13. The process of claim 10 wherein the inorganic blowing agent is selected from carbon dioxide, argon, water, and nitrogen.

14. The process of claim 1 wherein the blowing agent is an inorganic blowing agent, selected from carbon dioxide, argon, water, and nitrogen.

15. The process of claim 1 wherein the polypropylene has a melt flow rate of less than 10 dg/min.

16. The process of claim 1 wherein the foamable composition is co-extruded with a non-foamable molten polymer under conditions sufficient to form a sheet having foamed and non-foamed portions.

17. The process of claim 1 wherein the foam has an average cell size in the range of from 0.1 mm to 6.0 mm.

18. The process of claim 1 wherein the foam has an average cell size in the range of from 0.5 mm to 6.0 mm.

19. The process of claim 17 wherein the foam has an average cell size of at least 0.75 mm.

20. The process of claim 18 wherein the foam has an average cell size of at least 1.0 mm.

21. The process of claim 1 wherein at least 75 percent of the polymer in the sheet is a polypropylene having a melt strength in the range of from 25 to 60 cN when measured at 190° C.

22. The process of claim 1 wherein at least 95 percent of the polymer in the sheet is a polypropylene having a melt strength in the range of from 25 to 60 cN when measured at 190° C.

23. The process of claim 1 wherein the pressure of the foamable composition prior to extrusion is at least 3 MPa.

24. The process of claim 1 wherein the foam has an open cell content of less than 50 percent.

* * * * *